United States Patent Office 3,147,120
Patented Sept. 1, 1964

3,147,120
ANIMAL FEEDS CONTAINING ASPIRIN
Marion J. Caldwell, Quincy, Ill., assignor to Moorman Manufacturing Company, Quincy, Ill., a corporation of Illinois
No Drawing. Filed Sept. 30, 1958, Ser. No. 764,262
8 Claims. (Cl. 99—2)

This invention relates, generally, to improved animal feeds or rations, and more particularly to animal feeds or rations containing aspirin as a growth stimulant.

It has been unexpectedly discovered according to the present invention, that when aspirin is admixed in small concentrations to animal feeds beneficial results are obtained, particularly in respect to faster growth, usually expressed in terms of average daily gain in weight. According to experience accumulated to date, when test animals are fed with a feed or ration containing small but effective concentrations of aspirin, while control animals are fed the same feed or ration without the aspirin, the former show greater increases in average daily gain in weight. Such increases have been noted particularly in the cases of ruminants and poultry.

The extensive use of aspirin in medicine as an antipyretic and analgesic is well known. It is outstanding with respect to its low cost, safety, reliability, and almost universal effectiveness and therefore is the medicine of choice for a number of conditions. Insofar as we are aware it has never been used in, or proposed for use as a growth stimulant in animal feeds, or otherwise.

Accordingly, the object of the present invention, generally stated, is the provision of improved animal feeds which have growth stimulating characteristics due to the incorporation therein of small but effective concentrations of aspirin.

The following table summarizes the results of controlled feeding tests on cattle and shows the effectiveness of aspirin for fattening cattle:

TABLE 1

*Aspirin for Feeding Cattle*

[Extra gains and feed efficiency from 1 or 5 grams aspirin per head per day]

| Lot No. | Ration Fed | Initial Weight, lb. | Final Weight, lb. | Average Daily Gain (140 Days), lb. | Weight Gain, lb. | Feed Efficiency (lb. feed/ lb. gain), lb. |
|---|---|---|---|---|---|---|
| 1 | Basal Ration only. | 610.9 | 972.6 | 2.58 | 361.7 | 7.82 |
| 2 | Basal Ration plus 1 gram Aspirin (acetyl salicylic acid). | 612.1 | 1,011.2 | 2.85 | 399.1 | 7.46 |
| 3 | Basal Ration plus 5 grams Aspirin (acetyl salicylic acid). | 618.0 | 1,013.4 | 2.82 | 395.4 | 7.64 |

In the foregoing table the basic ration used had the following composition:

Mixed alfalfa-brome hay _____ Free choice.
Shelled yellow corn _____ Free choice.
Commercial cattle concentrate [1] _____ 1.0 lb./head/day.

[1] Commercially available protein-mineral concentrate containing 45% protein equivalent from oil meals and urea, 10% of a complex mineral mix, vitamins, 10 mg. of diethylstilbestrol per lb., and a small quantity of molasses.

The following table shows feeding data obtained on feeding chicks rations with and without aspirin:

TABLE 2

*Aspirin for Chick Growth*

| Lot No. | Ration | Chick Wt. at 3 Weeks, lb. | Percent Above Basal |
|---|---|---|---|
| 36 | Basal Broiler Ration | 0.686 | |
| 37 | Basal plus 1.0 gram aspirin/cwt | 0.708 | 3.2 |
| 38 | Basal plus 5.0 grams aspirin/cwt | 0.737 | 7.4 |
| 39 | Basal plus 25.0 grams aspirin/cwt | 0.729 | 6.3 |
| 40 | Basal plus 125.0 grams aspirin/cwt | 0.728 | 6.1 |

In Table 2 the basal broiler ration to which aspirin was added was as follows:

|   | Lb. |
|---|---|
| Ground yellow corn | 67 |
| Commercial chick concentrate [1] | 33 |
| Total | 100 |

[1] Commercially available chick concentrate containing soybean oil meal, alfalfa, meat scrap, fish meal, a complex mineral mix, vitamin sources and an antibiotic supplement (penicillin) in usual known proportions to result in a high energy chick feed when mixed with corn.

In preparing an animal feed containing aspirin, bulk aspirin in powdered form is added to the composition in such a way as to be intimately admixed therewith. For example, the aspirin may be first blended with either one of the ingredients, or a small portion of all of the ingredients, and then the initial blend or mixture is uniformly blended with the balance. In other words, any suitable mixing technique used in the animal feed manufacture, may be employed. No special precautions or safeguards appear to be required in manufacture, since aspirin is compatible with all the usual feed ingredients.

It appears that a useful range of concentration for aspirin in an animal feed ration is from about 0.002% to 0.05% by weight. Stated more broadly, a ration or feed should contain an effective amount of the aspirin for stimulating growth and increasing the average daily gain in weight of the animals. While the aspirin may be incorporated in much larger amounts than either an effective or optimum level without untoward effects, there is no need of using the aspirin in an amount greater than that which gives adequate to best results.

Although the aspirin-containing feeds appear to be useful for feeding animals generally, they have been found to have particular utility in ruminant and poultry feeds.

What is claimed as new is:

1. The method of stimulating growth of ruminants, poultry and swine which comprises feeding animals rations supplying an effective amount of aspirin for growth stimulation.

2. The method of stimulating growth which comprises feeding ruminants rations supplying an effective amount of aspirin for growth stimulation.

3. The method of stimulating growth which comprises feeding poultry rations supplying an effective amount of aspirin for growth stimulation.

4. The method of stimulating growth which comprises feeding swine rations supplying an effective amount of aspirin for growth stimulation.

5. Animal feed containing from 0.002% to 0.05% by weight of aspirin.

6. A ruminant feed containing from 0.002% to 0.05% by weight of aspirin.

7. A poultry feed containing from 0.002% to 0.05% by weight of aspirin.

8. A swine feed containing from 0.002% to 0.05% by weight of aspirin.

References Cited in the file of this patent

UNITED STATES PATENTS 2,927,884     Segard _____ Mar. 8, 1960

OTHER REFERENCES

Winslow: Veterinary Materia Medica Therapeutics, 1919, 8th edition, p. 364, American Veterinary Pub. Co., Chicago.

Gross: The Salicylates, p. 123 (1948), Hillhouse Press, New Haven. (Copies available in Div. 43.)